(12) United States Patent  (10) Patent No.: US 11,675,413 B2
Kan et al.  (45) Date of Patent: Jun. 13, 2023

(54) REDUCING POWER CONSUMPTION OF MEMORY DEVICES AT AN INFORMATION HANDLING SYSTEM

(71) Applicant: Dell Products L.P., Round Rock, TX (US)

(72) Inventors: Lip Vui Kan, Singapore (SG); Geroncio Ong Tan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 269 days.

(21) Appl. No.: 17/039,105

(22) Filed: Sep. 30, 2020

(65) Prior Publication Data

US 2022/0100256 A1  Mar. 31, 2022

(51) Int. Cl.
*G06F 1/32* (2019.01)
*G06F 3/06* (2006.01)
*G06F 1/3234* (2019.01)
*G06F 1/3228* (2019.01)

(52) U.S. Cl.
CPC .......... *G06F 1/3268* (2013.01); *G06F 1/3228* (2013.01); *G06F 3/0625* (2013.01); *G06F 3/0653* (2013.01); *G06F 3/0689* (2013.01)

(58) Field of Classification Search
CPC .... G06F 1/3268; G06F 1/3238; G06F 1/3258; G06F 1/3275; G06F 1/3287; G06F 1/3221; G06F 1/3225; G06F 3/0625
See application file for complete search history.

(56) References Cited

U.S. PATENT DOCUMENTS

| 8,397,087 | B1 * | 3/2013 | Gardner | G06F 1/329 713/340 |
| 8,429,041 | B2 * | 4/2013 | Bonalle | G06Q 20/00 705/35 |
| 8,799,553 | B2 * | 8/2014 | Hendry | G06F 12/06 711/202 |
| 2010/0299547 | A1 * | 11/2010 | Saika | G06F 1/3203 711/E12.001 |
| 2013/0067059 | A1 * | 3/2013 | Gatta | H04L 43/04 709/224 |

(Continued)

FOREIGN PATENT DOCUMENTS

CN 111399756 A * 7/2020

*Primary Examiner* — Jaweed A Abbaszadeh
*Assistant Examiner* — Cheri L Harrington
(74) *Attorney, Agent, or Firm* — McDermott Will & Emery LLP

(57) ABSTRACT

Reducing power consumption at an information handling system (IHS), including identifying a first data set associated with a first application, and a second data set associated with a second application; storing the first data set at a first physical storage device, and storing the second data set at a second physical storage device; reducing a power consumption of a storage device system, including: determining that the first and second applications are out-of-focus with respect to an operating system (OS) of the IHS, and in response, maintaining a low power state of the first and the second physical storage devices; detecting that the first application is in-focus with respect to the OS of the IHS, and in response, adjusting a power state of the first physical storage device from the low power state to an active power state while maintaining the low power state of the second physical storage device.

18 Claims, 3 Drawing Sheets

(56) References Cited

U.S. PATENT DOCUMENTS

| | | | |
|---|---|---|---|
| 2014/0359785 A1* | 12/2014 | Chandra | G06F 21/62 |
| | | | 726/27 |
| 2017/0024143 A1* | 1/2017 | Barot | G06F 3/0611 |
| 2017/0153842 A1* | 6/2017 | Iwabuchi | G06F 3/0643 |
| 2017/0235514 A1* | 8/2017 | Alshinnawi | G06F 3/0676 |
| | | | 711/112 |
| 2019/0065087 A1* | 2/2019 | Li | G06F 3/0673 |
| 2019/0129630 A1* | 5/2019 | Erez | G06F 3/0688 |
| 2021/0064113 A1* | 3/2021 | Laurent | G11C 11/2253 |

* cited by examiner

REDUCING POWER CONSUMPTION OF MEMORY DEVICES AT AN INFORMATION HANDLING SYSTEM

BACKGROUND

Field of the Disclosure

The disclosure relates generally to an information handling system, and in particular, reducing power consumption of memory devices at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems can include memory devices such as solid state devices (SSD) in the M.2 format. For example, the M.2 1113 is a ball grid array (BGA) form factor SSD that is 11.5 mm wide and 13 mm long. This form factor can include up to 1 TB capacity that is (at most) 1.65 mm in height. However, when multiple SSD cards are used, power consumption of the SSD cards is an issue that needs to be managed.

SUMMARY

Innovative aspects of the subject matter described in this specification may be embodied in method for reducing power consumption at an information handling system, the method comprising: identifying a storage device system including a plurality of separate physical storage devices of the information handling system; identifying i) a first data set associated with a first application that is executable by the information handling system, and ii) a second data set associated with a second application that is executable by the information handling system; storing the first data set at a first physical storage device of the plurality of separate physical storage devices, and storing the second data set at a second physical storage device of the plurality of separate physical storage devices; reducing a power consumption of the storage device system, including: determining, at a first time, that the first application and the second application are out-of-focus with respect to an operating system (OS) of the information handling system; in response to determining that the first application and the second application are out-of-focus, maintaining a low power state of the first physical storage device and the second physical storage device; detecting, at a second time after the first time, that the first application is in-focus with respect to the OS of the information handling system; and in response to detecting that the first application is in-focus, adjusting a power state of the first physical storage device from the low power state to an active power state while maintaining the low power state of the second physical storage device.

Other embodiments of these aspects include corresponding systems, apparatus, and computer programs, configured to perform the actions of the methods, encoded on computer storage devices.

These and other embodiments may each optionally include one or more of the following features. For instance, the first application is in-focus with respect to the OS of the information handling system when the OS executes the first application. Storing data associated with the OS at a third physical storage device of the plurality of separate physical storage devices; and maintain an active power state of the third physical storage device independent of the power state of the remaining physical storage devices of the plurality of separate physical storage devices. Detecting, at a third time after the second time, that the first application is out-of-focus with respect to the OS of the information handling system; and in response to detecting that the first application is out-of-focus, adjusting the power state of the first physical storage device from the active power state to the low power state. Detecting, at a third time after the second time, that the second application is in-focus with respect to the OS of the information handling system; and in response to detecting that the second application is in-focus, adjusting a power state of the second physical storage device from the low power state to an active power state. Identifying a type of the first data set and a type of the second data set, wherein the type of the first data set and the type of the second data set differ; identifying the first physical storage device based on the type of the first data set, wherein the first physical storage device stores additional data sets of the same type of the first data set; and identifying the second physical storage device based on the type of the second data set, wherein the second physical storage device stores additional data sets of the same type of the second data set. Identifying a historical usage of the first data set and a historical usage of the second data set; identifying the first physical storage device based on the historical usage of the first data set, wherein the first physical storage device stores additional data sets of similar historical usage of the first data set; and identifying the second physical storage device based on the historical usage of the second data set, wherein the second physical storage device stores additional data sets of similar historical usage of the second data set.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
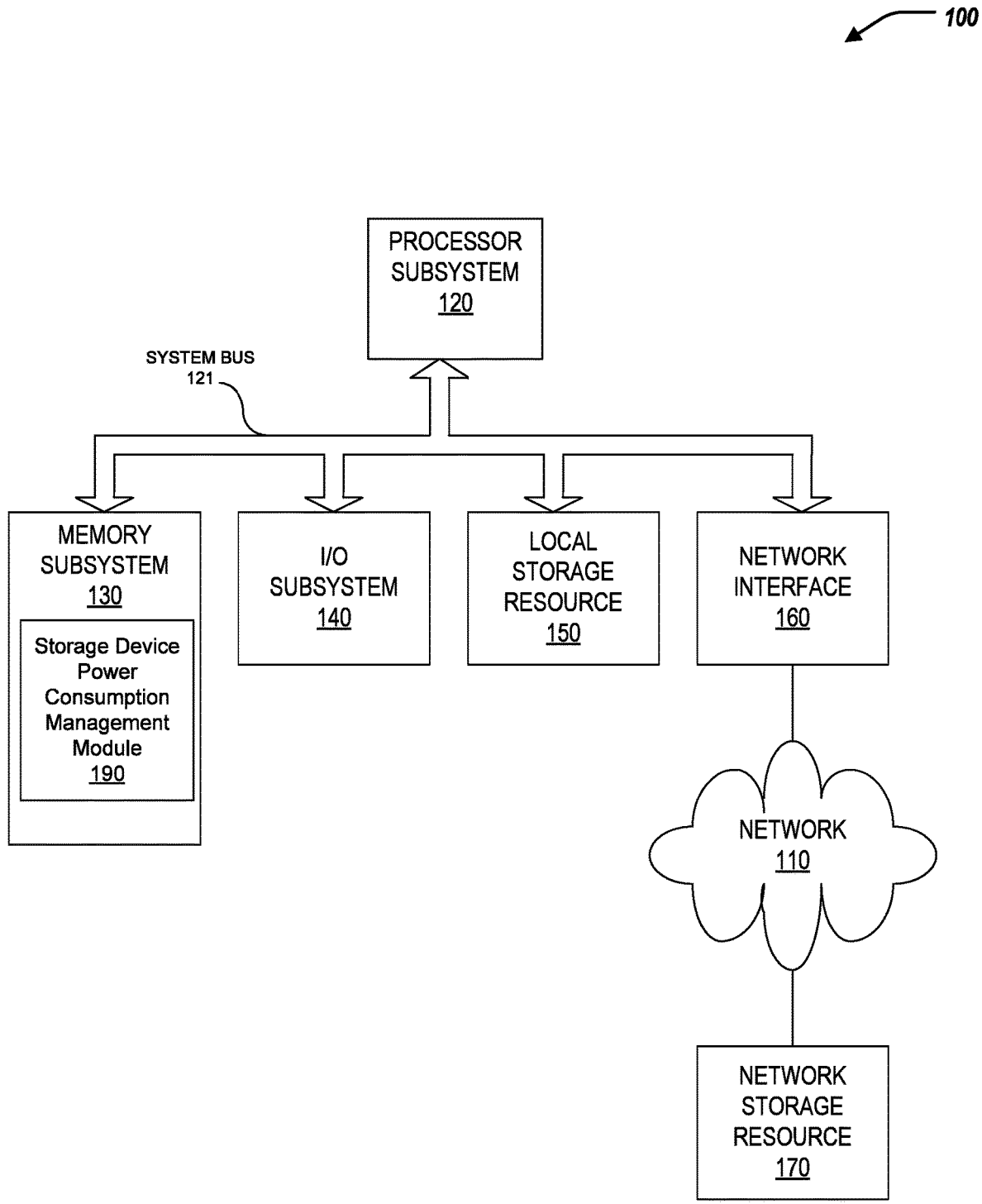
FIG. 1 is a block diagram of selected elements of an embodiment of an information handling system.

This disclosure discusses methods and systems for reducing power consumption of memory devices at an information handling system. In short, a storage device power consumption management module can store data sets intelligently at storage devices of the information handling system to conserve power usage of the storage devices. That is, the storage device power consumption management module can store data sets on particular storage devices such that only a limited number (or a minimal number) of the storage devices are to be powered on (in an active state) at a given time such that the remaining storage devices can be powered down (in an inactive state) to conserve/manage power of the storage devices. The storage device power consumption management module can store data sets at storage devices based on a type of application associated with the data sets, a historical usage of the data sets, or other. The storage device power consumption management module can allocate the data sets among the storage devices to minimize power consumption of the storage devices.

Specifically, this disclosure discusses a system and a method of reducing power consumption at information handling system, including identifying a storage device system including a plurality of separate physical storage devices of the information handling system; identifying i) a first data set associated with a first application that is executable by the information handling system, and ii) a second data set associated with a second application that is executable by the information handling system; storing the first data set at a first physical storage device of the plurality of separate physical storage devices, and storing the second data set at a second physical storage device of the plurality of separate physical storage devices; reducing a power consumption of the storage device system, including: determining, at a first time, that the first application and the second application are out-of-focus with respect to an operating system (OS) of the information handling system; in response to determining that the first application and the second application are out-of-focus, maintaining a low power state of the first physical storage device and the second physical storage device; detecting, at a second time after the first time, that the first application is in-focus with respect to the OS of the information handling system; and in response to detecting that the first application is in-focus, adjusting a power state of the first physical storage device from the low power state to an active power state while maintaining the low power state of the second physical storage device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
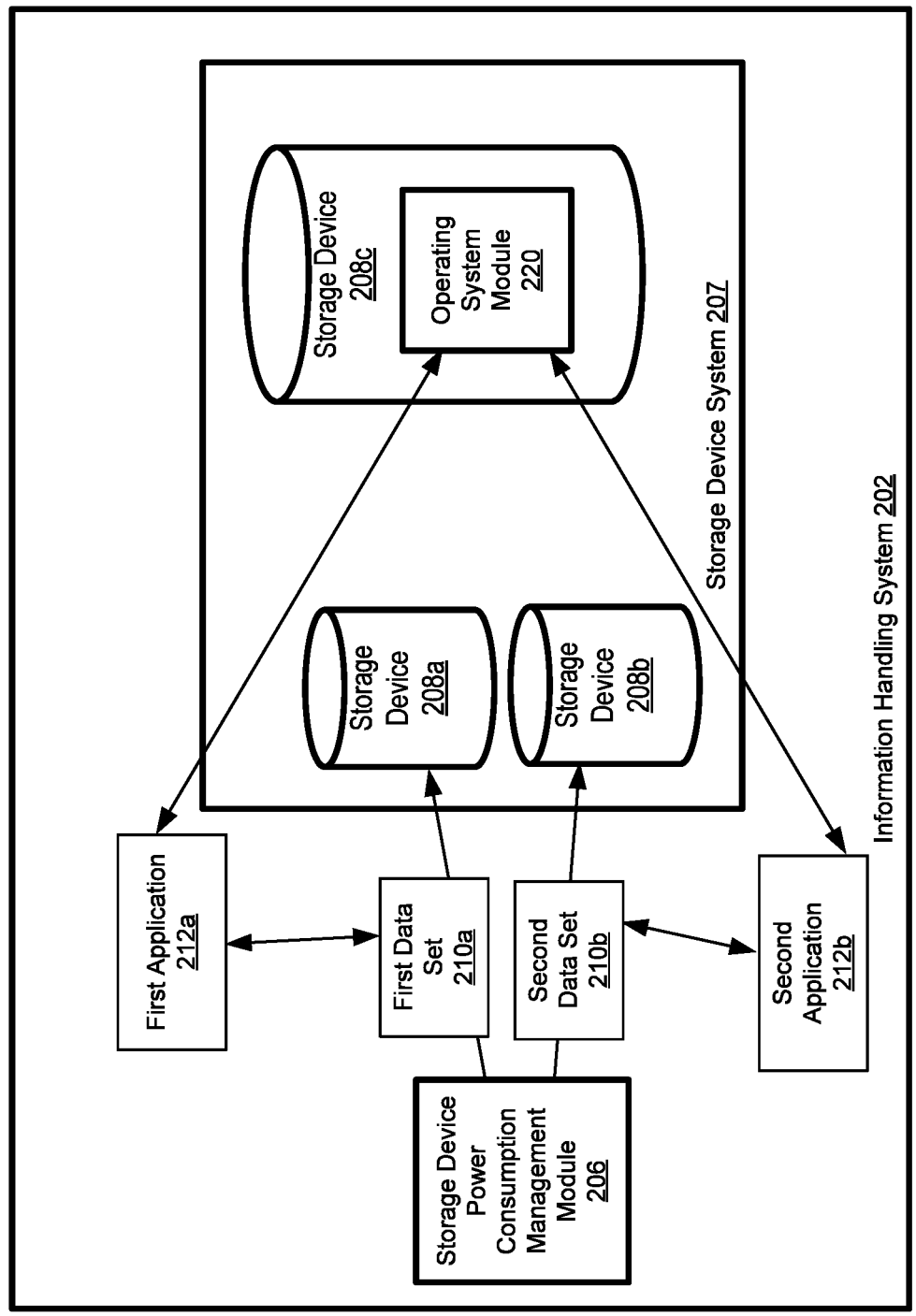
FIG. 2 illustrates a block diagram of the information handling system for reducing power consumption of memory devices at the information handling system.
Figure 3:
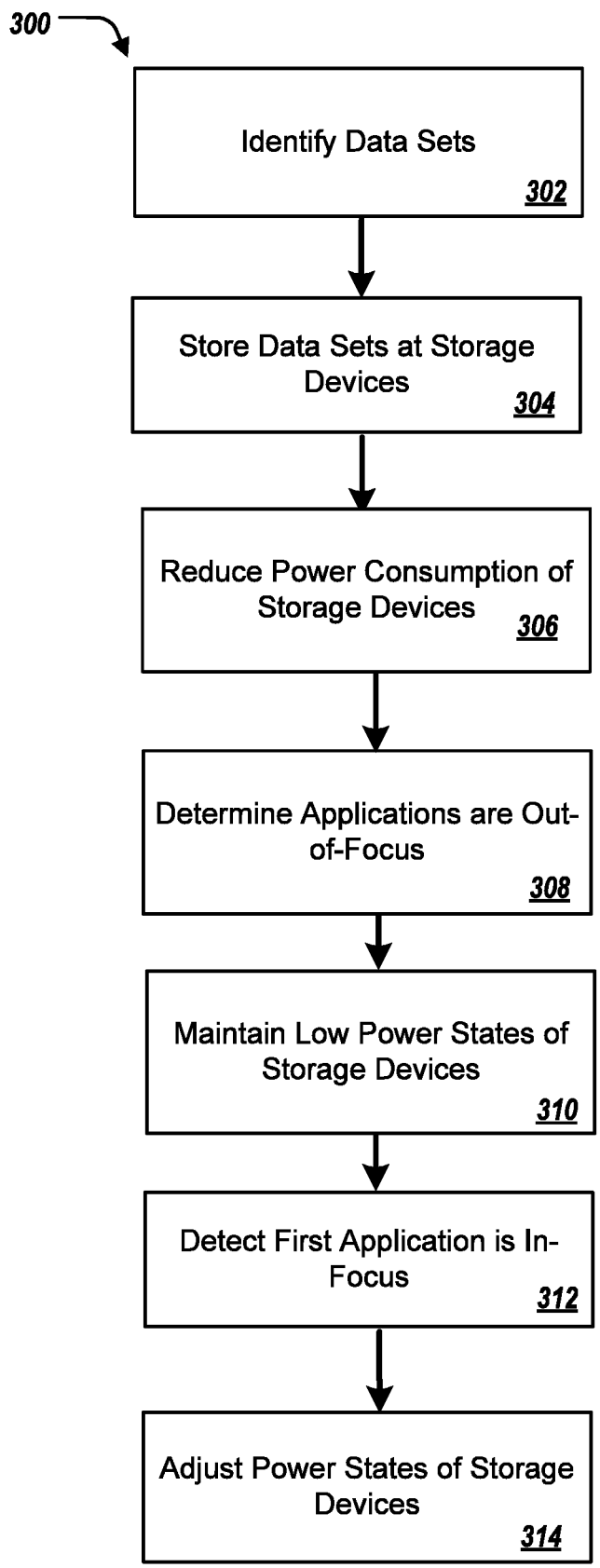
FIG. 3 illustrates a method for reducing power consumption of memory devices at the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a storage device power consumption management module 190. The storage device power management module 190 can be included by the memory subsystem 130. The storage device power management module 190 can include a computer-executable program (software) that is executed by the processor subsystem 120.

In short, the storage device power consumption management module 190 can store data sets intelligently at storage devices of the information handling system 100 to conserve power at the storage devices. That is, the storage device power consumption management module 190 can store data sets on particular storage devices such that only a limited number (or a minimal number) of the storage devices are to be powered on (in an active state) at a time such that the remaining storage devices can be powered down (in an inactive state) to conserve/manage power of the storage devices. The storage device power consumption management module 190 can store data sets at storage devices based on a type of application associated with the data sets, a historical usage of the data sets, or other. The storage device power consumption management module 190 can allocate the data sets among the storage devices to minimize power consumption at the storage devices.

Turning to FIG. 2, FIG. 2 illustrates an environment 200 including an information handling system 202. The information handling system (IHS) 202 can include a storage device power consumption management module 206, and a storage device system 207. The storage device system 207 can include storage devices 208a, 208b, 208c (collectively referred to as storage devices 208); however, the information handling system 202 can include any number of storage devices. The storage devices 208 can be separate physical storage devices. In some examples, the IHS 202 is similar to, or includes, the information handling system 100 of FIG. 1. In some examples, the storage device power consumption management module 206 is the same, or substantially the same, as the storage device power consumption management module 190 of FIG. 1. The storage device power consumption management module 206 can be in communication with the storage devices 208.

In some implementations, the storage device power consumption management module 206 can identify a first data set 210a. The first data set 210a can be associated with a first application 212a. The first application 212a is executable by the information handling system 202, and in particular the processor subsystem 120 of FIG. 1. The first application 212a can utilize the first data set 210a (or a portion of the first data set 210a) when the first application 212a is executed. Similarly, the storage device power consumption management module 206 can identify a second data set 210b. The second data set 210b can be associated with a second application 212b. The second application 212b is executable by the information handling system 202, and in particular the processor subsystem 120 of FIG. 1. The second application 212b can utilize the second data set 210b (or a portion of the second data set 210b) when the second application 212b is executed. The data sets 210a, 210b can be collectively referred to as data sets 210; and the applications 212a, 212b can be collectively referred to as applications 212.

The storage device power consumption management module 206 can store the first data set 210 at the physical storage device 208a. Further, the storage device power consumption management module 206 can store the second data set 210b at the storage device 208b. In some examples, the storage device power consumption management module 206 can store the data sets 210 at the respective storage devices 208 based on a type of the data sets 210. Specifically, the storage device power consumption management module 206 can identify a type of the first data set 210a and a type of the second data set 210b. The type of the data sets 210 can include a file extension type of the data sets—e.g., a.pst or a .docx type. The type of the first data set 210a and the type of the second data set 210b can differ. For example, the first data set 210a can include .pst data files, and the second data set 210b can include .docx data files. The storage device power consumption management module 206 can further identify a type of data files associated with the storage devices 208. In some examples, each of the storage devices 208 can be associated with a differing type of data file. For example, the storage device 208a is associated with the .pst data file type and can store additional data sets of the .pst data file type, and the storage device 208b is associated with the .docx file type and can store additional data sets of the .docx data file type. To that end, the storage device power consumption management module 206 can identify the storage device 208a for storing the first data set 210a based on the data file type of the first data set 210a and the type of data files previously stored at the storage device 208a. That is, the storage device 208a stores data files that are of a type that is the type of the first data set 210a—e.g., both of type .pst. Similarly, for example, the storage device power consumption management module 206 can identify the storage device 208b for storing the second data set 210b based on the data file type of the second data set 210b and the type of data files previously stored at the storage device 208b. That is, the storage devices 208b stores data files that are of a type that is the type of the second data set 210b—e.g., both of type .docx.

In some examples, the storage device power consumption management module 206 can store the data sets 210 at the respective storage devices 208 based on a historical usage of the data sets 210. Specifically, the storage device power consumption management module 206 can identify a historical usage of the first data set 210a and a historical usage of the second data set 210b. For example, the application 212a can be associated with a frequency of use by the information handling system 202, and based on such frequency of use, the first data set 210a is associated with a first historical usage. Similarly, the application 212b can be associated with a frequency of use by the information handling system 202, and based on such frequency of use, the second data set 210b is associated with a second historical usage. The first historical usage and the second historical usage can differ. For example, the frequency of use of the first application 212a can be greater than a frequency of use of the second application 212b (e.g., the first application 212a is "used," executed, or in-focus more as compared to the second application 212b); as a result, the historical usage of the first data set 210a can be greater than the historical usage of the second data set 210b. To that end, each of the storage devices 208 can be associated with historical usage as well. That is, each of the storage devices 208 can store additional data sets based on the historical usage of the additional data sets. For example, the storage device 208a can store additional data sets that are associated with the first historical usage (or similar to the first historical usage); and the storage device 208b can store additional data sets that are associated with the second historical usage (or similar to the second historical usage). The storage device power consumption management module 206 can then identify the storage device 208a for storing the first data set 210a based on the historical usage of the first data set 210a and the historical usage of the data files previously stored at the storage device 208a. That is, the storage device power consumption management module 206 identifies the storage device 208a as storing data files of historical usage similar to the historical usage of the first data set 210a. Similarly, the storage device power consumption management module 206 can then identify the storage device 208b for storing the second data set 210b based on the historical usage of the second data set 210b and the historical usage of the data files previously stored at the storage device 208b. That is, the storage device power consumption management module 206 identifies the storage device 208b as storing data files of historical usage similar to the historical usage of the second data set 210b.

In some examples, the storage device power consumption management module 206 can store data associated with an operating system (OS) module 220 at the storage device 208c. The OS module 220 can include the OS, a portion of the OS, and/or data related to the OS.

In some implementations, the storage device power consumption management module 206 can reduce the power consumption of the storage device system 207. Specifically, the storage device power consumption management module 206 determines, at a first time, that the first application 212a and the second application 212b are out-of-focus with respect to the OS module 220. That is, when the applications are out-of-focus, the OS module 220 is not currently executing the applications 212, the applications 212 are minimized, and/or the applications 212 are operating in the background of the information handling system 202. In some examples, the information handling system 202 can include an OS gauge computing module to determine the focus-state of the applications 212, instantaneously or in response to a request.

The storage device power consumption management module 206, in response to determining that the applications 212 are out-of-focus, maintains a low power state of the physical storage devices 208. That is, the storage device power consumption management module 206 ensure that the storage devices 208 are in a low power state, or a no-power state, or an power inactive state. Specifically, as the applications 212 are out-of-focus, the corresponding data sets 210 are not being utilized. Thus, access to the data sets 210 is not currently needed (e.g., by the OS module 220 and/or a processor). As a result, the storage devices 208 corresponding to the data sets 210 (storing the data sets 210) can be in a low power state based on the applications 212 being out-of-focus.

The storage device power consumption management module 206 can detect, at a second time after the first time, that the first application 212a is in-focus with respect to the OS module 220. That is, the first application 212a is in-focus when the OS module 220 executes the first application 212a—the first application 212a is in the foreground, and/or the application 212a is maximized (not minimized), with respect to the information handling system 202. The storage device power consumption management module 206, in response to detecting that the first application 212a is in-focus, adjusts the power state of the storage device 208a from the low power state to an active power state. That is, the storage device power consumption management module 206 places the storage device 208a in an active power state, or a high power state, or an active state. Specifically, as the application 212a is in-focus, the first data set 210a is being utilized. Thus, access to the first data set 210a is currently needed (e.g., by the OS module 220 and/or a processor). As a result, the storage device 208a corresponding to the first data set 210a (storing the first data set 210a) can be in an active power state based on the first application 212a being in-focus.

Moreover, the storage device power consumption management module 206, in response to detecting that the first application 212a is in-focus, maintains the low power state of the storage device 208b. That is, the storage device power consumption management module 206, in response to detecting that the first application 212a is in-focus, ensures that the storage device 208 is in a low power state, or a no-power state, or an power inactive state. In other words, the storage device power consumption management module 206, in response to detecting that the first application 212a is in-focus, places the storage device 208 in an active power state while maintaining the low power state of the storage device 208b. Specifically, as the second application 212b remains out-of-focus (while the first application 212a is in-focus), the second data set 210b is not being utilized. Thus, access to the second data set 210b is not currently needed (e.g., by the OS module 220 and/or a processor). As a result, the storage device 208b corresponding to the second data set 210b (storing the second data set 210b) can be in a low power state based on the second application 212b being out-of-focus.

In some examples, the storage device power consumption management module 206 maintains an active power state of the physical storage device 208c. That is, the storage device power consumption management module 206 maintains the active power state of the physical storage device 208c independent of the power state of the remaining storage device 208a, 208b. In other words, as the power state of the storage devices 208a, 208b are adjusted—from low power state to high power state, and high power state to low power state—the storage device power consumption management module 206 maintains an active power state of the physical storage device 208c. Thus, the OS computing module 220 is able to maintain an active power state. For example, the OS computing module 220 can facilitate operation of the storage device power consumption management module 206.

In some examples, the storage device power consumption management module 206 detects, at a third time after the second time, that the first application 212a is out-of-focus with respect to the OS module 220. That is, the first application 212a transitions from in-focus at the second time to out-of-focus at the third time. At the third time, the OS module 220 is not currently executing the first application 212a, the first application 212 is minimized, and/or the first application 212a is operating in the background of the information handling system 202. The storage device power consumption management module 206, in response to detecting that the first application 212a is out-of-focus, adjust the adjusts the power state of the storage device 208a from the active power state (or high power state) to an inactive power state (or low power state). Additionally, the storage device power consumption management module 206, in response to detecting that the first application 212a is out-of-focus, maintains the low power state of the storage device 208b. That is, the storage device power consumption management module 206, in response to detecting that the first application 212a is out-of-focus, ensures that the storage device 208b remains in a low power state, or a no-power state, or an power inactive state.

In some examples, the storage device power consumption management module 206 detects, at a fourth time after the second time, that the second application 212b is in-focus with respect to the OS module 220. That is, the second application 212b transitions from out-of-focus at the second time to in-focus at the fourth time. At the fourth time, the OS module 220 is executing the second application 212b, the second application 212b is in the foreground, and/or the second application 212b is maximized (not minimized), with respect to the information handling system 202. The storage device power consumption management module 206, in response to detecting that the second application 212b is in-focus, adjusts the power state of the storage device 208b from the inactive power state (or low power state) to an active power state (or high power state). Additionally, the storage device power consumption management module 206, in response to detecting that the second application 212b is in-focus, maintains the active power state of the storage device 208a. That is, the storage device power consumption management module 206, in response to detecting that the second application 212b is in-focus, ensures that the storage device 208a remains in the active power state.

FIG. 3 illustrates a flowchart depicting selected elements of an embodiment of a method 300 for reducing power consumption of memory devices at the information handling system. The method 300 may be performed by the information handling system 100, the information handling system 202 and/or the storage device power consumption management module 206, and with reference to FIGS. 1-2. It is noted that certain operations described in method 300 may be optional or may be rearranged in different embodiments.

The storage device power consumption management module 206 identifies i) the first data set 210a associated with the first application 212a that is executable by the information handling system 202, and ii) the second data set 210b associated with the second application 212b that is executable by the information handling system 202 (302). The storage device power consumption management module 206 stores the first data set 210a at the first physical storage device 208a of the plurality of separate physical storage devices 208, and stores the second data set 210b at the second physical storage device 208b of the plurality of separate physical storage devices 208 (304). The storage device power consumption management module 206 reduces a power consumption of the storage device system 207 (306). The storage device power consumption management module 206 determines, at a first time, that the first application 212a and the second application 212b are out-of-focus with respect to the OS module 220 of the information handling system 202 (308). The storage device power consumption management module 206, in response to determining that the first application 212a and the second application 212b are out-of-focus, maintains a low power state of the first physical storage device 208a and the second physical storage device 208b (310). The storage device power consumption management module 206 detects, at a second time after the first time, that the first application 212a is in-focus with respect to the OS module 220 of the information handling system 202 (312). The storage device power consumption management module 206, in response to detecting that the first application 212a is in-focus, adjusting a power state of the first physical storage device 208a from the low power state to an active power state while maintaining the low power state of the second physical storage device 208b.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of reducing power consumption at an information handling system, the method comprising:
    identifying a storage device system including a plurality of separate physical storage devices of the information handling system;
    identifying a first physical storage device of the plurality of separate physical storage devices associated with a first historical usage, the first historical usage indicating a first frequency of use of data sets, stored by the first physical storage device, by applications executable by the information handling system when the applications are in-focus with respect to an operating system (OS) of the information handling system;
    identifying a second physical storage device of the plurality of separate physical storage devices associated with a second historical usage, the second historical usage indicating a second frequency of use of data sets, stored by the second physical storage device, by applications executable by the information handling system when the applications are in-focus with respect to the OS of the information handling system, the first historical usage greater than the second historical usage;
    identifying i) a first data set associated with a first application that is executable by the information handling system, and ii) a second data set associated with a second application that is executable by the information handling system;
    storing the first data set at the first physical storage device of the plurality of separate physical storage devices, and storing the second data set at the second physical storage device of the plurality of separate physical storage devices;
    determining, at a first time, that the first application and the second application are out-of-focus with respect to an operating system (OS) of the information handling system;
    in response to determining that the first application and the second application are out-of-focus, i) entering a low power state of the first physical storage device such that the first data set and additional data sets stored by the first physical storage device are not utilized and ii) entering a low power state of the second physical storage device such that the second data set and additional data sets stored by the second physical storage device are not utilized;
    detecting, at a second time after the first time, that the first application is in-focus with respect to the OS of the information handling system; and
    in response to detecting that the first application is in-focus, adjusting a power state of the first physical storage device from the low power state to an active power state while maintaining the low power state of the second physical storage device.

2. The method of claim 1, wherein the first application is in-focus with respect to the OS of the information handling system when the OS executes the first application.

3. The method of claim 1, further comprising:
    storing data associated with the OS at a third physical storage device of the plurality of separate physical storage devices; and
    maintain an active power state of the third physical storage device independent of the power state of the remaining physical storage devices of the plurality of separate physical storage devices.

4. The method of claim 1, further comprising:
- detecting, at a third time after the second time, that the first application is out-of-focus with respect to the OS of the information handling system; and
- in response to detecting that the first application is out-of-focus, adjusting the power state of the first physical storage device from the active power state to the low power state.

5. The method of claim 1, further comprising:
- detecting, at a third time after the second time, that the second application is in-focus with respect to the OS of the information handling system; and
- in response to detecting that the second application is in-focus, adjusting a power state of the second physical storage device from the low power state to an active power state.

6. The method of claim 1, further comprising:
- identifying a type of the first data set and a type of the second data set, wherein the type of the first data set and the type of the second data set differ;
- identifying the first physical storage device based on the type of the first data set, wherein the first physical storage device stores additional data sets of the same type of the first data set; and
- identifying the second physical storage device based on the type of the second data set, wherein the second physical storage device stores additional data sets of the same type of the second data set.

7. An information handling system comprising a processor having access to memory media storing instructions executable by the processor to perform operations comprising, comprising:
- identifying a storage device system including a plurality of separate physical storage devices of the information handling system;
- identifying a first physical storage device of the plurality of separate physical storage devices associated with a first historical usage, the first historical usage indicating a first frequency of use of data sets, stored by the first physical storage device, by applications executable by the information handling system when the applications are in-focus with respect to an operating system (OS) of the information handling system;
- identifying a second physical storage device of the plurality of separate physical storage devices associated with a second historical usage, the second historical usage indicating a second frequency of use of data sets, stored by the second physical storage device, by applications executable by the information handling system when the applications are in-focus with respect to the OS of the information handling system, the first historical usage greater than the second historical usage;
- identifying i) a first data set associated with a first application that is executable by the information handling system, and ii) a second data set associated with a second application that is executable by the information handling system;
- storing the first data set at the first physical storage device of the plurality of separate physical storage devices, and storing the second data set at the second physical storage device of the plurality of separate physical storage devices;
- determining, at a first time, that the first application and the second application are out-of-focus with respect to an operating system (OS) of the information handling system;
- in response to determining that the first application and the second application are out-of-focus, i) entering a low power state of the first physical storage device such that the first data set and additional data sets stored by the first physical storage device are not utilized and ii) entering a low power state of the second physical storage device such that the second data set and additional data sets stored by the second physical storage device are not utilized;
- detecting, at a second time after the first time, that the first application is in-focus with respect to the OS of the information handling system; and
- in response to detecting that the first application is in-focus, adjusting a power state of the first physical storage device from the low power state to an active power state while maintaining the low power state of the second physical storage device.

8. The information handling system of claim 7, wherein the first application is in-focus with respect to the OS of the information handling system when the OS executes the first application.

9. The information handling system of claim 7, the operations further comprising:
- storing data associated with the OS at a third physical storage device of the plurality of separate physical storage devices; and
- maintain an active power state of the third physical storage device independent of the power state of the remaining physical storage devices of the plurality of separate physical storage devices.

10. The information handling system of claim 7, the operations further comprising:
- detecting, at a third time after the second time, that the first application is out-of-focus with respect to the OS of the information handling system; and
- in response to detecting that the first application is out-of-focus, adjusting the power state of the first physical storage device from the active power state to the low power state.

11. The information handling system of claim 7, the operations further comprising:
- detecting, at a third time after the second time, that the second application is in-focus with respect to the OS of the information handling system; and
- in response to detecting that the second application is in-focus, adjusting a power state of the second physical storage device from the low power state to an active power state.

12. The information handling system of claim 7, the operations further comprising:
- identifying a type of the first data set and a type of the second data set, wherein the type of the first data set and the type of the second data set differ;
- identifying the first physical storage device based on the type of the first data set, wherein the first physical storage device stores additional data sets of the same type of the first data set; and
- identifying the second physical storage device based on the type of the second data set, wherein the second physical storage device stores additional data sets of the same type of the second data set.

13. A non-transitory computer-readable medium storing software comprising instructions executable by one or more computers which, upon such execution, cause the one or more computers to perform operations comprising:

identifying a storage device system including a plurality of separate physical storage devices of the information handling system;
identifying a first physical storage device of the plurality of separate physical storage devices associated with a first historical usage, the first historical usage indicating a first frequency of use of data sets, stored by the first physical storage device, by applications executable by the information handling system when the applications are in-focus with respect to an operating system (OS) of the information handling system;
identifying a second physical storage device of the plurality of separate physical storage devices associated with a second historical usage, the second historical usage indicating a second frequency of use of data sets, stored by the second physical storage device, by applications executable by the information handling system when the applications are in-focus with respect to the OS of the information handling system, the first historical usage greater than the second historical usage;
identifying i) a first data set associated with a first application that is executable by an information handling system, and ii) a second data set associated with a second application that is executable by the information handling system;
storing the first data set at the first physical storage device of the plurality of separate physical storage devices, and storing the second data set at the second physical storage device of the plurality of separate physical storage devices;
determining, at a first time, that the first application and the second application are out-of-focus with respect to an operating system (OS) of the information handling system;
in response to determining that the first application and the second application are out-of-focus, i) entering a low power state of the first physical storage device such that the first data set and additional data sets stored by the first physical storage device are not utilized and ii) entering a low power state of the second physical storage device such that the second data set and additional data sets stored by the second physical storage device are not utilized;
detecting, at a second time after the first time, that the first application is in-focus with respect to the OS of the information handling system; and
in response to detecting that the first application is in-focus, adjusting a power state of the first physical storage device from the low power state to an active power state while maintaining the low power state of the second physical storage device.

14. The computer-readable medium of claim 13, wherein the first application is in-focus with respect to the OS of the information handling system when the OS executes the first application.

15. The computer-readable medium of claim 13, the operations further comprising:
    storing data associated with the OS at a third physical storage device of the plurality of separate physical storage devices; and
    maintain an active power state of the third physical storage device independent of the power state of the remaining physical storage devices of the plurality of separate physical storage devices.

16. The computer-readable medium of claim 13, the operations further comprising:
    detecting, at a third time after the second time, that the first application is out-of-focus with respect to the OS of the information handling system; and
    in response to detecting that the first application is out-of-focus, adjusting the power state of the first physical storage device from the active power state to the low power state.

17. The computer-readable medium of claim 13, the operations further comprising:
    detecting, at a third time after the second time, that the second application is in-focus with respect to the OS of the information handling system; and
    in response to detecting that the second application is in-focus, adjusting a power state of the second physical storage device from the low power state to an active power state.

18. The computer-readable medium of claim 13, the operations further comprising:
    identifying a type of the first data set and a type of the second data set, wherein the type of the first data set and the type of the second data set differ;
    identifying the first physical storage device based on the type of the first data set, wherein the first physical storage device stores additional data sets of the same type of the first data set; and
    identifying the second physical storage device based on the type of the second data set, wherein the second physical storage device stores additional data sets of the same type of the second data set.

\* \* \* \* \*